(12) United States Patent
Casanelles Moix et al.

(10) Patent No.: US 11,278,951 B2
(45) Date of Patent: Mar. 22, 2022

(54) PENDULAR HANDLING SYSTEM FOR A PRESS LINE

(71) Applicant: ABB SCHWEIZ AG, Baden (CH)

(72) Inventors: Ramon Casanelles Moix, Sant Cugat del Valles (ES); José Ruiz González, Manresa (ES)

(73) Assignee: ABB SCHWEIZ AG, Baden (CH)

( * ) Notice: Subject to any disclaimer, the term of this patent is extended or adjusted under 35 U.S.C. 154(b) by 246 days.

(21) Appl. No.: 16/474,001

(22) PCT Filed: Dec. 27, 2016

(86) PCT No.: PCT/EP2016/082697
§ 371 (c)(1),
(2) Date: Jun. 26, 2019

(87) PCT Pub. No.: WO2018/121838
PCT Pub. Date: Jul. 5, 2018

(65) Prior Publication Data
US 2020/0290108 A1    Sep. 17, 2020

(51) Int. Cl.
*B25J 9/00* (2006.01)
*B21D 43/10* (2006.01)
*B21D 22/02* (2006.01)
*B25J 9/04* (2006.01)

(52) U.S. Cl.
CPC .......... *B21D 43/105* (2013.01); *B21D 22/02* (2013.01); *B25J 9/0042* (2013.01); *B25J 9/0084* (2013.01); *B25J 9/0087* (2013.01); *B25J 9/04* (2013.01)

(58) Field of Classification Search
None
See application file for complete search history.

(56) References Cited

U.S. PATENT DOCUMENTS

| 2004/0091348 A1* | 5/2004 | Kong ................. B25J 17/0266 414/735 |
| 2015/0246446 A1* | 9/2015 | Casanelles Moix ........ B25J 15/0052 414/226.01 |

(Continued)

FOREIGN PATENT DOCUMENTS

| EP | 0914879 A1 | 5/1999 |
| JP | H0442391 U | 4/1992 |

(Continued)

OTHER PUBLICATIONS

International Search Report and Written Opinion of the International Searching Authority, International Application No. PCT/EP2016/082697 issued by the European Patent Office, dated Sep. 14, 2017, 15 pages, Rijswijk, Netherlands.

*Primary Examiner* — Gerald McClain
(74) *Attorney, Agent, or Firm* — Peter B. Scull; EIP US LLP (57) ABSTRACT

A pendular handling system for handling parts in a press line may have two articulated robots arranged on opposite sides with respect to the central vertical plane of the press line, each robot having at least four rotational axes in series between a robot base and a robot wrist, and each robot being mounted with the first axis horizontal and perpendicular to the press line flow direction, a first arm of each robot can swing in a vertical plane in the press line flow direction.

16 Claims, 5 Drawing Sheets

(56) References Cited

U.S. PATENT DOCUMENTS

2015/0292909 A1* 10/2015 Jonsson ............... G01B 7/004
                                                                  324/207.15
2017/0113431 A1    4/2017 Lee

FOREIGN PATENT DOCUMENTS

| KR | 101616577 B1 | 4/2016 |
|----|--------------|--------|
| WO | WO2014060021 A1 | 4/2014 |

* cited by examiner

PENDULAR HANDLING SYSTEM FOR A PRESS LINE

The present disclosure is related to a handling system for handling parts in a press line, for example for unloading parts from a press and/or loading parts to a press in a stamping press line.

BACKGROUND

It is known to use industrial robots for loading and unloading workpieces or parts in a press line, such as stamping press lines for manufacturing vehicle bodywork parts. For example, systems having floor-mounted or roof-mounted articulated robots or other kinds of manipulators may be employed for loading and unloading blanks in press lines.

Some of the known solutions, such as manipulators with a single arm to which a gripper is attached, may suffer from problems of vibrations, especially when dealing with large blanks and at very high speed.

Other systems include a manipulator that is mounted on the press itself and has two arms articulated to a common crosspiece, to which a gripper is attached. These are not so affected by vibration issues, but they have a relatively high cost and are not versatile.

Another known system involves a pendulum-like solution, with two manipulators, that in some cases may be attached to the press itself. Each manipulator has an arm, mounted on a first horizontal rotation axis, so swinging in a vertical plane, and on this arm is mounted a linear axis: i.e. the arm includes a guide system, along which the linear axis may slide longitudinally. A crossbar is mounted between the linear axes of the two manipulators, and a gripper is attached to the crossbar. Thus, the system generally has at least a rotation axis and a linear axis. This solution may allow a fast operation, but it has the drawback that the crossbar must extend all the distance between the arms of the two manipulators, and has a fixed length: for this reason, the press needs to be adapted so as to provide extra space between the press and the columns of the press, so that the columns do not interfere with the crossbar. Furthermore, the guides of the die may interfere with the crossbar, and may need to be adapted. As a consequence, this solution is only suitable for presses and press dies that are adapted to the handling system, which are expensive, are not versatile, and take up a large floor space. Furthermore, its use is limited to press lines with a relatively reduced inter-press distance.

It has now been found that it is possible to provide an improved system for handling parts, for example for unloading parts from a press and/or loading parts to a press in a press line, which takes advantage of pendular motion but overcomes the drawbacks of known pendulum systems.

SUMMARY

According to a first aspect, the present disclosure provides a pendular handling system for handling parts in a press line, having two articulated robots arranged on opposite sides with respect to the central vertical plane of the press line, each robot having at least four rotational axes in series between a robot base and a robot wrist, and each robot being mounted with the first axis horizontal and perpendicular to the press line flow direction, a first arm of each robot being capable of swinging in a vertical plane in the press line flow direction.

Mounting the robots with their first axes horizontal and perpendicular to the press line flow direction allows them to operate with a pendulum-like motion, thereby profiting from the advantages associated with this kind of solution, such as speed, and relevant cycle improvement may be obtained with respect to known handling systems that use articulated robots mounted in conventional way, i.e. with their first axes in a vertical direction.

Furthermore, implementation with articulated robots with at least four rotational axes in series additionally overcomes the limitations of known pendulum systems. Indeed, the four rotational axes of the robot provide the degrees of freedom required for the press loading/unloading operations, while at the same time maintaining the wrists of the robots at a desired distance from each other, which may be smaller than the distance between the bases of the robots, and therefore smaller than the press width. This means that the system can use crossbars of different lengths, for example a shorter crossbar, thus avoiding interference with the guides of the press die. The system is therefore suitable and efficient for all kinds of presses and dies.

Moreover, the articulated robots with at least four rotational axes in series may be standard industrial robots, which are highly versatile and have a much lower cost, and usually higher reliability and easier maintenance than dedicated manipulators designed and programmed for specific press systems and operations.

According to further aspects, the present disclosure provides a method for handling parts in a press line and a stamping press line provided with a pendular handling system according to the first aspect disclosed above.

Additional objects, advantages and features of implementations of the disclosure will become apparent to those skilled in the art upon examination of the description, or may be learned by practice.

BRIEF DESCRIPTION OF THE DRAWINGS

Particular implementations of the present disclosure will be described in the following by way of non-limiting examples, with reference to the appended drawings, in which.

DETAILED DESCRIPTION OF EXAMPLES

Figure 1:
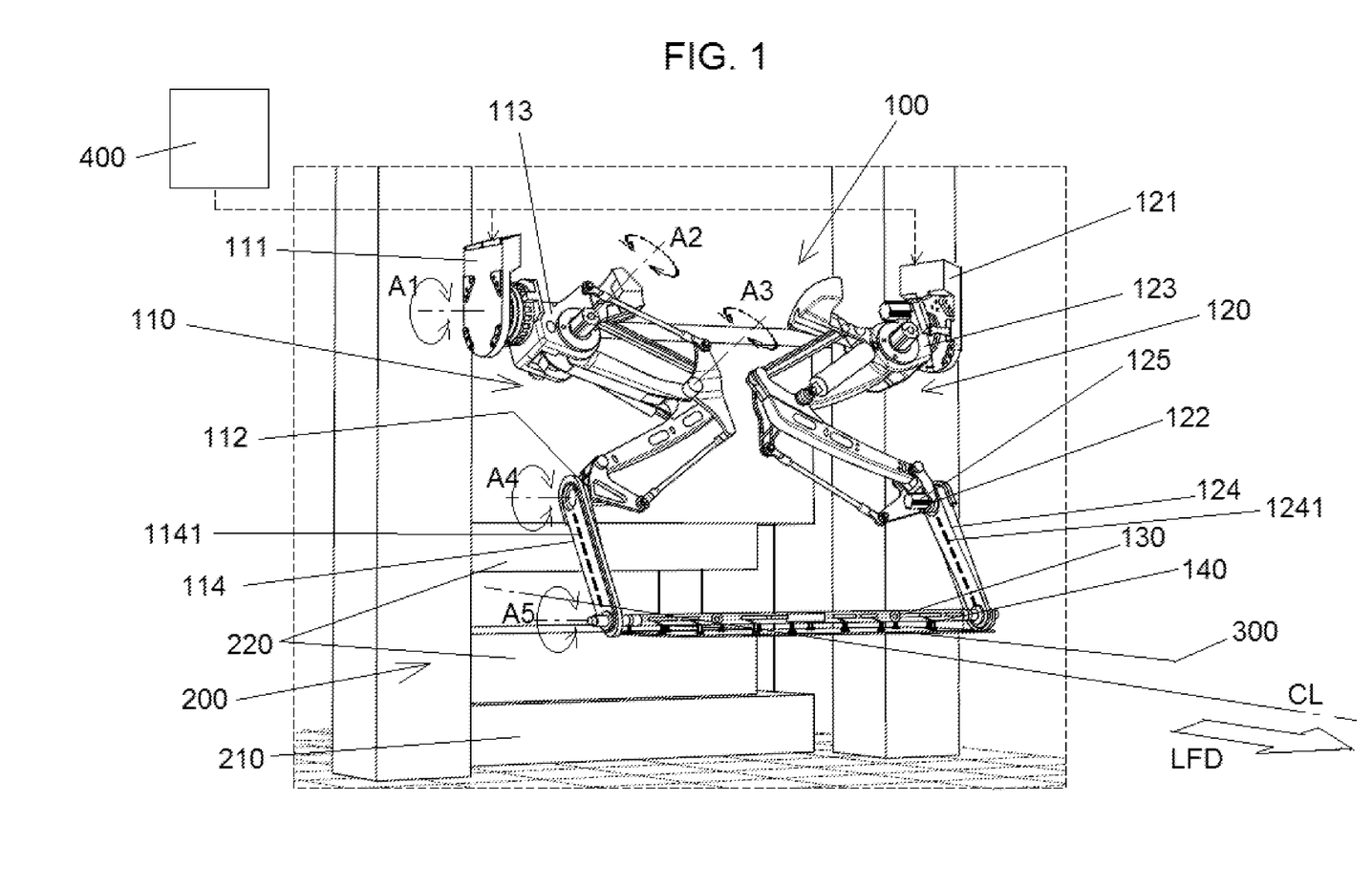
FIG. 1 is a schematic perspective view of a pendular handling system for handling parts in a press line according to an implementation of the present disclosure.

FIG. 1 shows a system 100 for handling workpieces in a press line, for example a multi-stage press line, of the kind employed for example for stamping metal parts 300 such as vehicle body parts.

The system of FIG. 1 may be employed for unloading parts 300 from a first station 200 in the press line, and transferring them to a second station (not shown) in the press line. The first and second stations in the press line may generally be presses, i.e. the system is intended especially, but not exclusively, for inter-press handling.

The press 200 has a base or bolster 210, and a die 220. In the shown example, the die 220 is narrower than the bolster (this is visible on the right hand side of the figure), but in other cases a die that has the same dimension of the bolster 210 may be employed.

As shown in the attached figures the present system 100 may have two articulated industrial robots 110, 120. The system may also include a control unit 400 for the control of both robots, for example a single control unit to control the two robots 110, 120 jointly.

Control units that may operate robots jointly are for example those available from ABB (Zürich, Switzerland, website www.abb.com) which include the function Multi-Move; MultiMove is a function embedded e.g. into ABB's IRC5 control module, that allows control of the axes of several manipulators or robots such that they work like a single robot.

Alternatively, each robot 110, 120 may include a control unit, the two control units being synchronized.

Each of the robots 110, 120 of the pendular handling system 100 may be an articulated robot with at least four rotational axes, mounted in series between a robot base 111, 121, and a robot wrist 112, 122.

In the example shown in FIG. 1 the robots 110, 120 have four rotational axes in series, shown as A1, A2, A3 and A4 for robot 110, between the base 111 and the wrist 112. However, the amount of axes will depend on the specific requirements of each case.

The two robots 110, 120 may be arranged, as shown in FIG. 1, on opposite sides with respect to the central vertical plane of the press line, i.e. the vertical plane containing the central line CL of the press line. The central line CL, shown in FIG. 1, is the line in the press line flow direction (shown by arrow LFD) on which the centres of the successive stations of the press line are arranged.

The two robots 110, 120 may be mounted with their first axis A1 horizontal and perpendicular to the press line flow direction LFD. As a consequence, the first arms of the robots, such as the first arm 113 and the first arm 123 shown in FIG. 1, can swing in parallel vertical planes, in the press line flow direction LFD, i.e. in vertical planes parallel to the central vertical plane of the press line as defined above.

The "first arm" of a robot is defined herein as the arm or part of the robot that is mounted on and rotates about the first axis; this part is sometimes called "lower arm", when industrial robots are floor mounted and with their first axis in vertical direction.

The robots 110, 120 of the pendular handling system 100 may be wall-mounted, for example with their bases fixed to a vertical wall; they may be mounted on a structure attached to the press, or on an independent structure.

The two robots 110, 120 may be mounted with their first axes above the central line CL of the press line, for example near the top of the presses as shown in FIG. 1, such that the robot wrists remain below the first axis of the robots during the press loading/unloading operation of the system.

However, in other implementations they may be mounted in a lower position, such that the wrists swing above the first axis during the press loading/unloading operation of the system.

As also shown in FIG. 1, the two robots 110, 120 may be mounted such that their first axes (see first axis A1 in FIG. 1 for robot 110) are aligned with each other.

The robots 110, 120 may be standard industrial robots, such as those often mounted in a conventional arrangement for loading and unloading parts from presses. In some cases standard industrial robots may require some adaptation in order to be mounted with their first axis horizontal, such as for example different bearings for the first axis.

Each of the robots 110, 120 may be provided with an additional arm 114, 124, that has a proximal end fixed to the corresponding robot wrist 112 or 122, and a distal end carrying an additional rotational axis.

In the example of FIG. 1, the additional arm 114, 124 of each robot is mounted on and rotating about the fourth axis, because the robots 110, 120 have four axes and therefore the wrist is mounted on the fourth axis: for example, as shown in the figure the additional arm 114 of robot 110 is mounted on the fourth axis A4, and rotates about this axis. The additional rotational axis at the distal end of the arm 114, 124 is a fifth axis, and is shown as A5 for robot 110.

If the robots had e.g. six axes, the additional arms 114, 124 would be mounted on and rotating about the sixth axis of each robot, and the additional axis would be a seventh axis.

The robots 110, 120 of the handling system 100 may have a motor mounted on the additional arm 114, 124, near its proximal end, and a transmission 1141, 1241 between the motor and the additional rotational axis. Such a motor is shown with reference 125 for robot 120. The corresponding motor for robot 110 is not visible in the position of FIG. 1.

Other alternatives are possible to the motor and transmission along the additional arm 114, 124, such as for example providing a passive additional arm attached to the robot wrist, sometimes known as a "boom" in this technical field), and a motor arranged at the distal end of the additional arm or boom to provide the additional rotational axis.

The additional rotational axes of the robots, such as A5, allow the handled part 300 to be tilted and therefore to be maintained in horizontal position when the first arms of the robots swing about axis A1.

As also shown in FIG. 1, the rotation axes of the wrists, i.e. the fourth axes A4 in this example, and the additional rotational axes, i.e. A5 in this example, may be parallel to each other and to the first axes A1 of the robots.

In some implementations the pendular handling system 100 may further include a crossbar 130 (FIG. 1), having its opposite ends attached to the additional axes, such as A5, of the two robots 110, 120. The crossbar 130 may carry the gripper system 140 for picking the part 300 to be handled.

The gripper 140 may include a mechanical, electromagnetic, vacuum or other gripping system, suitable to safely pick and displace the parts 300.

A handling system 100 with a crossbar 130 may be employed to handle one part 300 between two stations of the press line, and also to handle at the same time two parts 300 (for example two smaller parts) that are formed at the same time in the stations of the press line.

The system has the advantage that it may incorporate crossbars of different lengths, depending on the requirements.

In some implementations the crossbar 130 may be adjustable in length, such that it can be adapted to different distances between the die guides, if any. Length adjustment of the crossbar is also useful when two parts 300 are loaded/unloaded simultaneously by the system, and there is a shift in the distance between the parts from one press to another: the adjustable crossbar, with two independent grippers, allows unloading from one press two parts 300 that are at a certain distance from each other, and loading them in the next press at a different distance.

Implementations of a stamping press line may include at least one press, and usually will include several stations, including several presses, and at least one pendular handling system, such as system 100 disclosed above, for loading parts to the press or for unloading parts from the press. It may have several pendular handling systems, for example one associated with each interpress of the line.

FIGS. 2A to 2F illustrate in perspective view six successive positions of the robots of a pendular handling system, such as the system 100 of FIG. 1, in a sequence of operation in which the system unloads a blank or part 300 from a station 200 of a press line, in this case a press, and loads the part to the following station. For clarity reasons, the second station and part of the structure of the first station have been omitted.

The robots 110, 120 may be operated for example by the control unit 400 of FIG. 1, which controls all the movements of the robots, including those of the additional axes A5.

It should be noted that FIG. 1 and FIGS. 2A to 2F are merely schematic views of simulations of the robots and movements in a handling system as disclosed herein, and they may not show accurately the dimensions and positions of the robots, their axes and their arms.

Figures 2A, 2B, 2C:
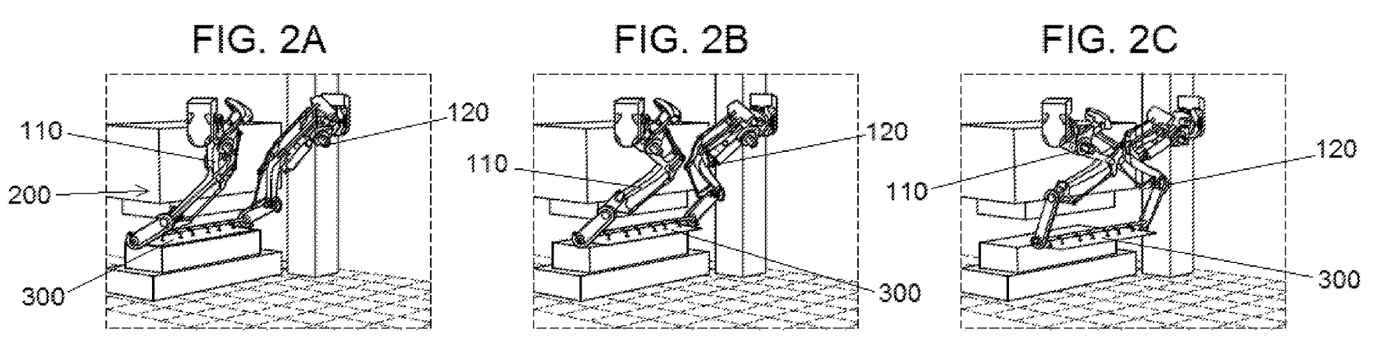
FIGS. 2A to 2F are schematic perspective views of a system according to an implementation of the present disclosure, in different positions during a loading/unloading operation.

In FIG. 2A the robots 110 and 120 are unloading a part 300 from the press 200.

As the robots 110, 120 transport the part 300 away from the press 200 and towards the following press (not shown), the successive positions shown in FIGS. 2A to 2F illustrate how the first arms 113, 123 of the robots 110, 120 swing in parallel vertical planes in the press line flow direction LFD and about horizontal axis A1, while the crossbar 130 may rotate about the additional axis A5 at the end of the additional arms 114, 124, and therefore the gripper 140 and the part 300 may be maintained horizontal.

Figures 2D, 2E, 2F:
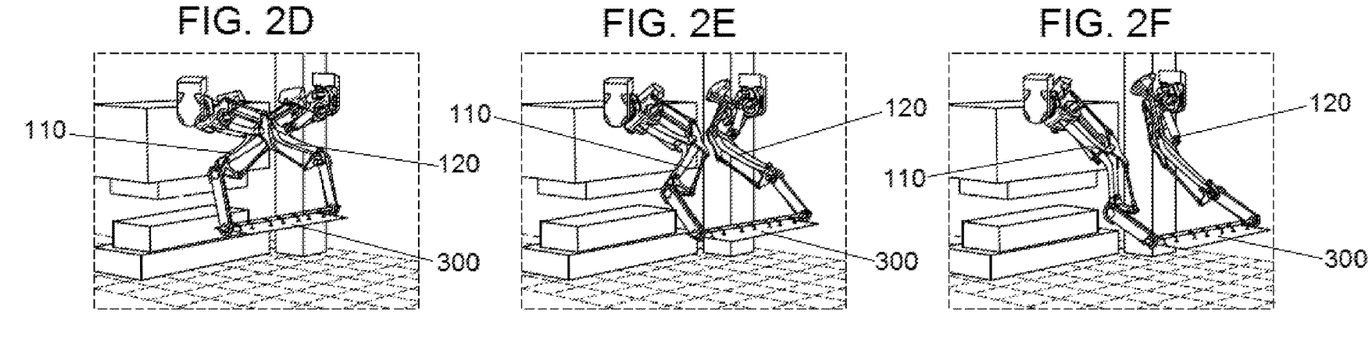

In FIG. 2F the robots 110, 120 are in position for loading the part 300 in the following press (not shown).

After loading the part 300 in the second station, the robots 110, 120 may be operated to return the gripper 140, empty, to the first station 200, in order to pick another part, with an opposite sequence of movements, such as from FIG. 2F to FIG. 2A.

Since the wrists 112, 122 of the two robots 110 and 120, and therefore also the additional arms 114, 124 and axes A5, may be maintained at a constant distance throughout the loading/unloading operation, and this distance may be as desired, for example smaller than the distance between the guides of the press dies, pendular handling systems as disclosed above may be provided with relatively short crossbars that do not interfere with the guiding system of the press dies.

The above FIGS. 1 and 2 show a handling system with a crossbar 130 that extends substantially all the length of the die: in this case, the fifth axes A5 and the arms 114, 124 of the two robots 110, 120 move in a space that remains available on the sides of the die, because in this case the die 220 is narrower than the underlying bolster 210.

However, by using industrial robots such as explained above, handling systems as disclosed herein may also work with shorter crossbars, thereby allowing working also in cases where the dies are as wide as the bolster and there is no space available on the sides of the die. This is an advantage over prior pendular systems.

Figure 3:
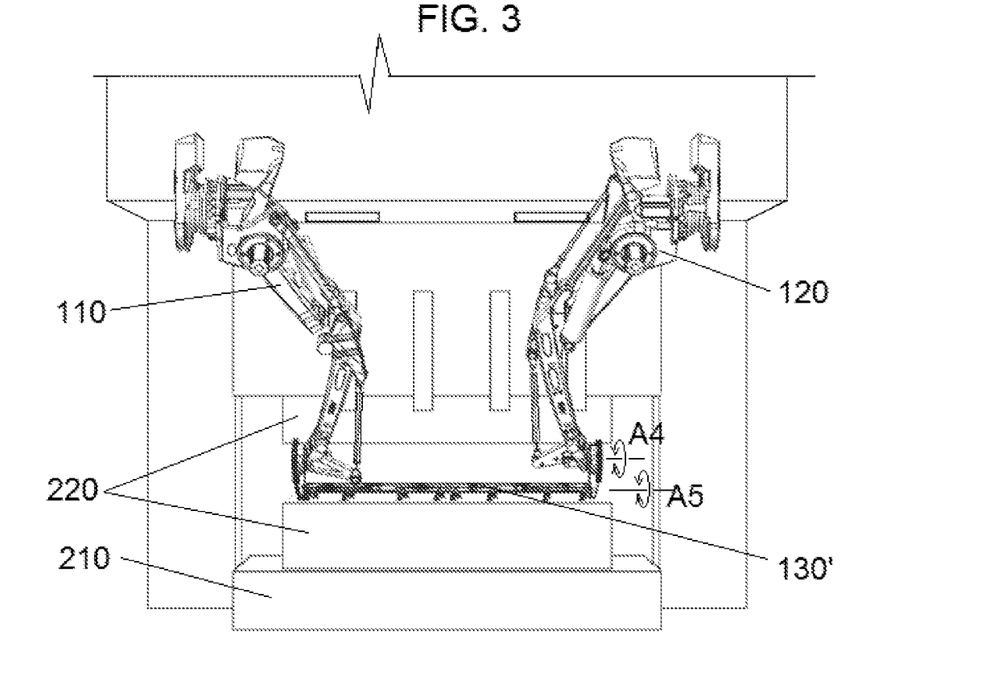
FIGS. 3 and 4 are front and lateral elevation views of a handling system according to another example.
Figure 4:
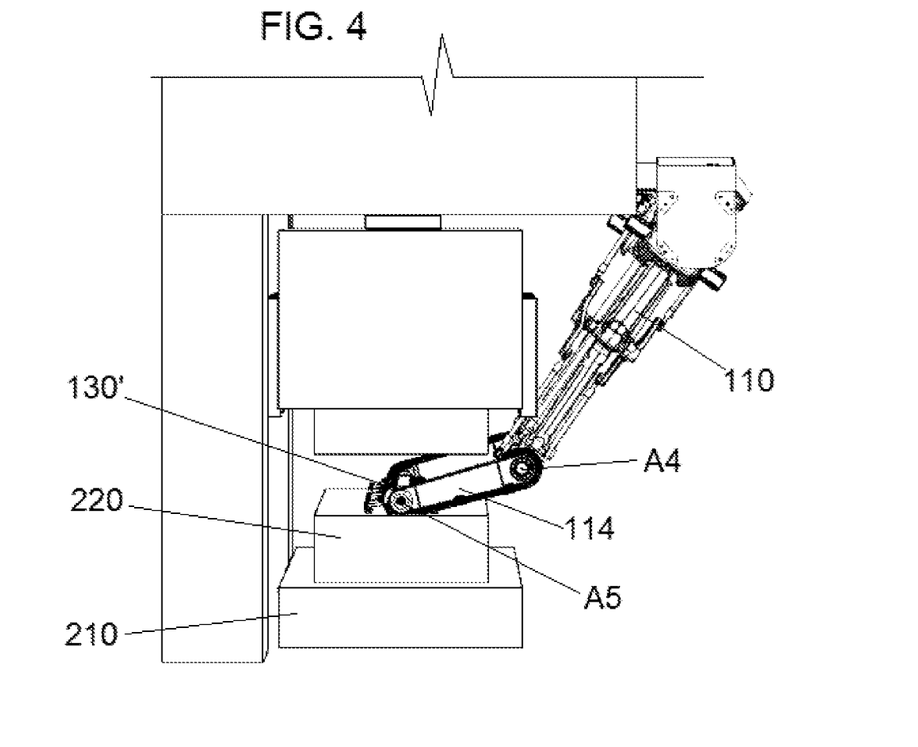

FIGS. 3 and 4 show in front and side elevation view, respectively, an example of a handling system with two robots 110, 120 carrying a crossbar 130' which is shorter than the width of the die 220. This system does not require an additional space for the arms 114, 124 on the sides of the die and can avoid interference with the die guides, if any.

The successive positions of the system for unloading a part from a press and load it in another press may in part be similar to those shown in FIGS. 2A-2F. However, FIG. 4 shows how, in this case of a shorter crossbar 130', the robots 110, 120 may place the crossbar 130' inside the press without requiring space on the side of the dies, and without interfering with the upper and lower parts of the die 220, by increasing the rotation angle of the fourth axis A4, such that the arms 114, 124 can enter into the die substantially horizontal.

In FIGS. 3 and 4 some columns of the press have been omitted for clarity purposes.

Figure 5:
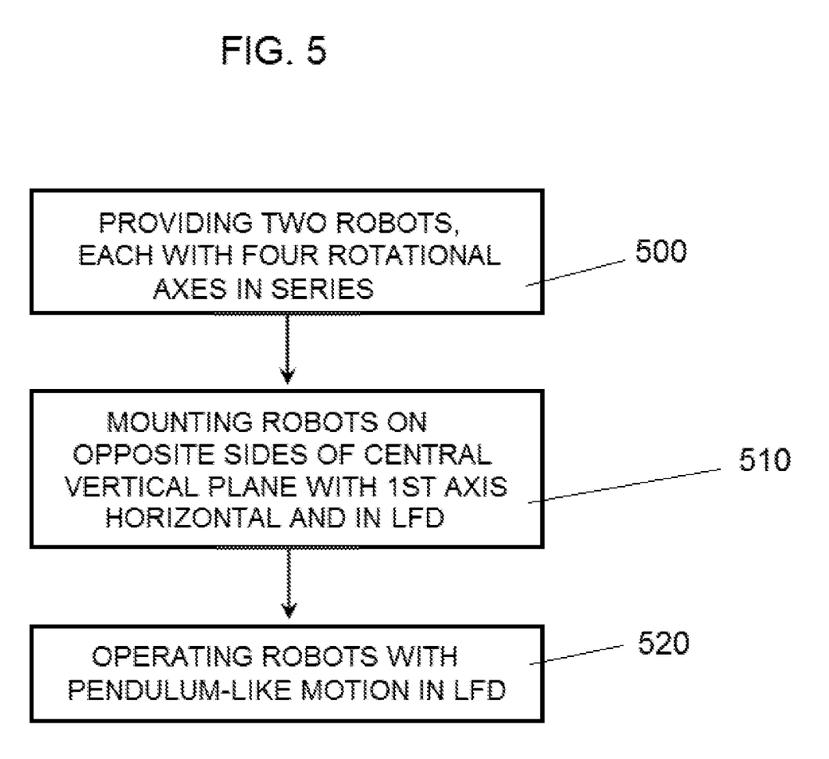
FIG. 5 is a flow chart illustrating implementations of a method for handling parts in a press line.

Taking into account the above disclosure, it will be understood that implementations of a method for handling parts in a press line as disclosed herein may include, as illustrated in the flow chart of FIG. 5:

in step 500, providing two articulated robots having at least four rotational axes in series between a robot base and a robot wrist;

in step 510, mounting the robots on opposite sides with respect to the central vertical plane of the press line, with their first axes horizontal and perpendicular to the press line flow direction, and in step 520, operating the robots with a pendulum-like motion in the direction of the press line flow LFD, to unload parts from one press of the press line and load the parts in another press of the press line, for example as shown in the sequence of FIGS. 2A-2F.

In step 520 the first axes of the two robots swing in parallel vertical planes in the direction of the press line flow LFD.

In some implementations of the method, the two robots provided in step 500 may be provided with an additional arm and an additional rotational axis, and may also be provided with a crossbar, for example as disclosed above in relation to FIG. 1 or to FIGS. 3 and 4.

In some implementations, such as disclosed in FIGS. 2A-2F, the two robots may be operated jointly to handle a part between them, to pick the part from one station and deliver it to the following station of the press line.

It should be noted that in other implementations of a pendular handling system such as disclosed herein, the crossbar 130 or 130' described above may be omitted, and each robot 110, 120 may carry its own gripper, for example attached to the wrist, or to the additional fifth axis A5 if such an additional axis is included, or to an additional seventh axis, if the robots employed are six-axes robots plus an additional axis.

Figure 6:
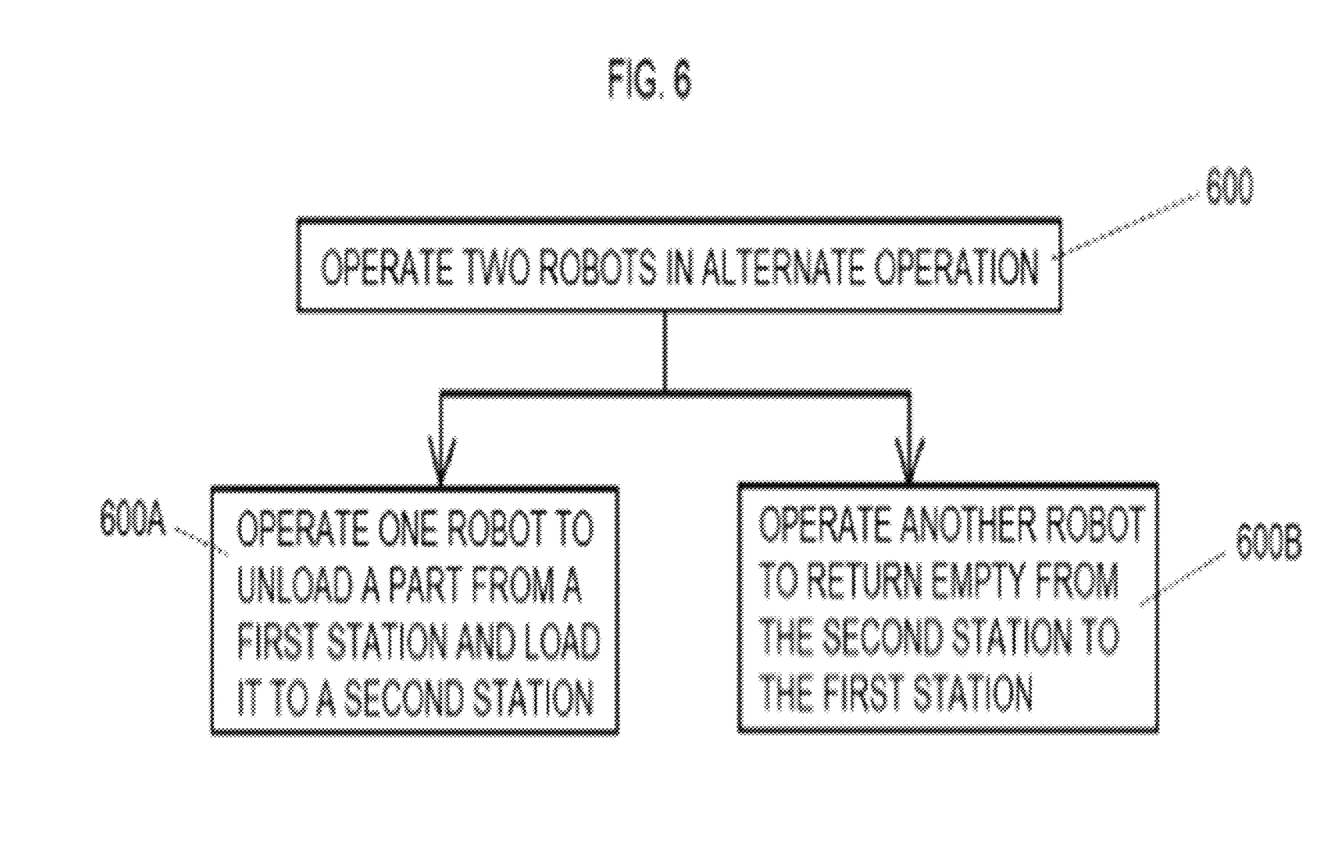
FIG. 6 is a flow chart illustrating implementations of a method for handling parts in a press line.

The system with two robots 110, 120 carrying independent grippers may be used to handle two different parts 300 between stations, especially if the parts are relatively small and/or have a relatively small weight: a robot may unload one part 300 from a station and load it to the next station, and the other robot may do the same with another part 300. This may be done by the system in at least two modes of operation:

(a) with the two robots working in parallel operation, such as to handle two parts 300 that are simultaneously pressed in each station of the press line, and therefore with a movement similar to that in FIG. 2, but wherein the robots 110, 120 carry one smaller part 300 each; or (b) with the two robots working in alternate operation see FIG. 6, operation 600, such that one robot unloads one part 300 from a first station and loads it to a second station, operation 600A, while the other robot returns empty from the second station towards the first, prepared to handle the next part 300, operation 600B.

Such a system with two robots carrying independent grippers may also be used to handle a single part 300 between them, in a synchronised movement similar to that illustrated in FIGS. 2A-2F. This system may be sufficient in some cases, although the presence of the crossbar makes the system more rigid and safer, especially if relatively heavy parts are to be handled.

Examples of commercial serial robots that may be employed in pendular handling systems such as disclosed herein are 4-axes robots such as IRB 660 and IRB 760 or 6-axes robots such as IRB 6660, all available from ABB (Zurich, Switzerland, website www.abb.com). The arm with the additional rotational axis would be fixed to the wrist of such a robot, that is, to the sixth axis or to the fourth axis, respectively, as disclosed above.

Although only a number of particular implementations and examples have been disclosed herein, it will be understood by those skilled in the art that other alternative implementations and/or uses of the disclosed devices or methods and obvious modifications and equivalents thereof are possible. Furthermore, the present disclosure includes all possible combinations of the particular implementations described. The scope of protection should not be limited by particular examples but should be determined only by a fair reading of the claims that follow.

The invention claimed is:

1. A pendular handling system for handling parts in a press line, the press line having a central vertical plane and a press line flow direction, the system comprising
    two articulated robots mounted on opposite sides with respect to the central vertical plane of the press line,
    each robot comprising at least a robot base, a robot wrist, a first arm and at least four rotational axes in series between each robot base and each robot wrist, the at least four rotational axes including a first axis and a last axis, the last axis being defined as a rotational axis of the robot wrist, and
    each robot being mounted with the first axis of the at least four rotational axes horizontal and mounted perpendicular to the press line flow direction, and,
    the two robots being mounted such that the first axes of the two robots, which are horizontal and perpendicular to the press line flow direction, are aligned with each other;
    the first arm of each robot operable to swing in a vertical plane in the press line flow direction;
    each robot further comprising an additional arm that has a proximal end fixed to the robot wrist and a distal end carrying an additional rotational axis;
    the system further comprising a crossbar with its ends attached to the additional axes of the two robots and adapted to carry a gripper system for picking parts to be handled;
    the rotational axis of the wrist of each robot, the additional rotational axis carried at the distal end of each additional arm, and the crossbar, all being disposed as parallel to each other.

2. A system as claimed in claim 1, the robots being wall mounted.

3. A system as claimed in claim 2, each robot being mounted with its base fixed to a vertical wall.

4. A system as claimed in claim 1, comprising the motor is mounted on the additional arm near the proximal end, and a transmission between the motor and the additional rotational axis.

5. A system as claimed in claim 1,
    the at least four rotational axes including a wrist rotation axis; and,
    the robots being configured such that the wrist rotation axes of the wrists of the robots and the additional rotational axes are parallel to each other and to the first axes of the robots.

6. A system as claimed in claim 1, each robot being mounted on a structure attached to a press of the press line.

7. A system as claimed in claim 1, the crossbar being adjustable in length.

8. A system as claimed in claim 1, the robots being 4-axes robots.

9. A system as claimed in claim 1, comprising a control unit configured to operate the two robots jointly, such that the two robots can handle a part between them.

10. A stamping press line comprising successive stations arranged along a press line flow direction and at least one handling system as claimed in claim 1 for one or both loading parts to a station of the stamping press line or unloading parts from a station of the stamping press line.

11. A system as claimed in claim 1, the robots being mounted with their first axes above the central line of the press line, such that the robot wrists remain below the first axis of the robots during a press loading/unloading operation.

12. A method for handling parts in a press line, comprising:
    providing two articulated robots having at least four rotational axes in series between a robot base and a robot wrist, each robot further comprising an additional arm that has a proximal end fixed to the robot wrist and a distal end carrying an additional rotational axis, the at least four rotational axes including a first axis and a last axis, the last axis being defined as a rotational axis of the robot wrist;
    mounting the robots on opposite sides with respect to the central vertical plane of the press line, with their first axes horizontal and perpendicular to the press line flow direction, the first arm of each robot disposed to swing in a vertical plane in the press line flow direction,
    including mounting the two robots such that the first axes of the two robots, which are horizontal and perpendicular to the press line flow direction, are aligned with each other; and
    operating the robots with the swing of the first arm of each robot in a vertical plane in the direction of the press line flow to unload parts from one station of the press line and load the parts in another station of the press line
    the method further comprising attaching a crossbar to the two robots with the ends of the crossbar attaching to the additional axes of the two robots and the crossbar carrying a gripper system for picking parts to be handled;
    disposing parallel to each other the rotational axis of the wrist of each robot, the additional rotational axis carried at the distal end of each additional arm, and the crossbar.

13. A method as claimed in claim 12, the robots being operated jointly to handle a part between them.

14. A method as claimed in claim 12, the two robots being operated alternately, such that while one robot unloads one part from a first station and loads it to a second station, the other robot returns empty from the second station towards the first.

15. A method as claimed in claim 12, further comprising providing a crossbar with its ends attached to the additional axes of the two robots and adapted to receive a gripper system for picking the parts to be handled.

16. A method as claimed in claim 12, further comprising mounting the robots with their bases attached to vertical walls.

\* \* \* \* \*